United States Patent [19]

Popovich et al.

[11] Patent Number: 4,843,659
[45] Date of Patent: Jul. 4, 1989

[54] TUB APPARATUS

[75] Inventors: John M. Popovich, Los Angeles; Roc V. Fleishman, Venice, both of Calif.

[73] Assignee: Softub, Inc., Pacoima, Calif.

[21] Appl. No.: 891,232

[22] Filed: Jul. 30, 1986

[51] Int. Cl.⁴ ............................................. A61H 33/02
[52] U.S. Cl. ......................................... 4/542; 4/584; 4/493; 4/506; 428/316.6; 220/414; 417/367
[58] Field of Search .................... 4/538, 541, 542, 544, 4/493, 584, 506; 428/316.6; 417/367; 220/3, 414; 156/189, 213

[56] References Cited

U.S. PATENT DOCUMENTS

| | | | |
|---|---|---|---|
| 2,734,459 | 2/1956 | Zimsky | 417/367 X |
| 3,734,811 | 5/1973 | Small et al. | 428/316.6 X |
| 3,943,580 | 3/1976 | Carter | 4/542 X |
| 3,970,210 | 7/1976 | Katsuta | 428/319.1 X |
| 4,546,900 | 10/1985 | Lackey | 428/35 X |
| 4,699,288 | 10/1987 | Mohan | 220/3 |

FOREIGN PATENT DOCUMENTS 64002  3/1969  Australia ............. 428/316.6
904763  8/1962  United Kingdom ............. 428/316.6

Primary Examiner—Charles E. Phillips
Attorney, Agent, or Firm—William W. Haefliger

[57] ABSTRACT

A water supply and heating package, for a hot tub, spa, or pool comprising
 (a) a support,
 (b) water circulating structure carried by said support and including a pump and connections circulating water from and toward the interior of the hot tub, spa or pool,
 (c) said structure including an electric motor connected in driving relation with said pump, and including a shunt duct connected with said water circulating structure and located to receive heat generated by operation of said motor to heat a side stream of said water passing through said shunt duct.

Also, the apparatus may include a foamed plastic sheet or sheets wound in a spiral to form multiple layers, and defining an insulative, upstanding side wall of a tub, and a bottom wall attached to the side wall.

10 Claims, 2 Drawing Sheets

TUB APPARATUS

BACKTROUND OF THE INVENTION

This invention relates generally to hot tubs or spas, and more particularly to a low-cost, light-weight, insulated, semi-rigid plastic spa, which is easily portable, and hot water supply means therefor.

Conventional hot tubs are heavy, non-portable, and expensive in their construction; also, excessive electrical and heat energy is required for their operation. There is need for a greatly improved spa structure with the unusual advantages in construction, modes of operation, use and transport, and results, as are now made possible by the present invention, as will appear.

SUMMARY OF THE INVENTION

It is a major object of the invention to provide a hot tub or spa meeting the above needs. Basically, the inexpensive, light-weight tub apparatus comprises:

(a) a foamed plastic sheet or sheets wound in a spiral to form multiple layers, and defining an insulative, upstanding side wall of a tub, and (b) a bottom wall attached to said side wall.

As will appear, the layers may consist of foamed polyethylene and may be fusion welded; and flexible, porous fiber screen possibly of glass fiber may be interposed between the wound layers to reinforce same, and allow fusion welding in the gaps between warp and woof strands of the fiber.

It is a further object to provide a protective and decorative plastic jacket covering the inner side of said side wall and overlying the bottom wall; and as will appear the jacket may also surround the outer side of the side wall, and consist of waterproof vinyl material.

It is a further object of the invention to provide ports through the wound plastic layers, together with water circulating means connected with said ports and including a pump for circulating water from and toward the interior of said tub. Such means typically includes an electric motor connected in driving relation with said pump, and including a shunt duct connected with said water circulating means and located to receive heat generated by operation of the motor to heat a side stream of the water passing through the shunt duct; and the shunt duct advantageously includes metallic tubing wrapped about the electric motor to utilize its waste heat for transfer to the water flowing to the spa. A filter in the spa removes foreign objects that could otherwise flow to the pump outside the spa, the filter being readily accessible for cleaning.

Finally, the invention contemplates use of a cover extending over the interior of the tub, the cover including a foamed plastic sheet or sheets wound in a spiral about a vertical axis, to form a thick insulative layer without excessive waste of materials, further contributing to low manufacturing costs. The cover layers may also be vinyl jacketed.

These and other objects and advantages of the invention, as well as the details of an illustrative embodiment, will be more fully understood from the following specification and drawings, in which:

DRAWING DESCRIPTION

DETAILED DESCRIPTION

Figure 3:
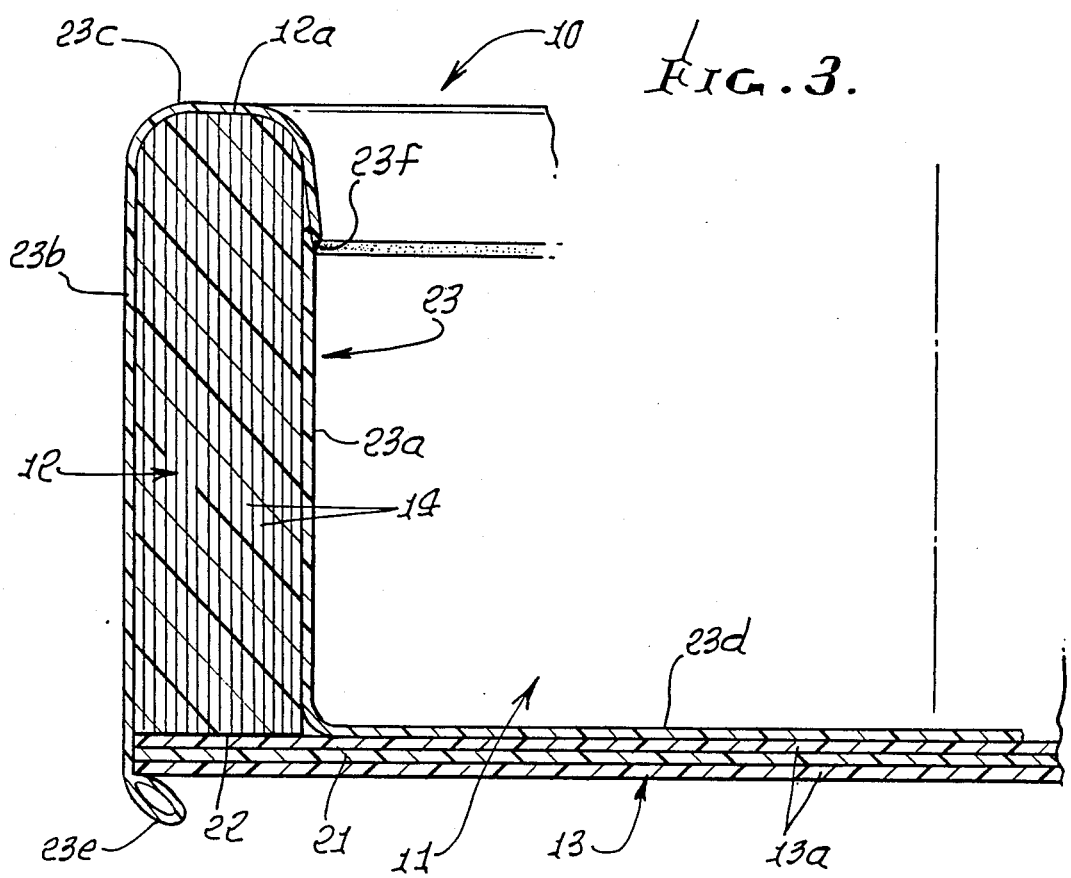
FIG. 3 is an enlarged section showing construction of the spa side wall and bottom wall.
Figure 6:
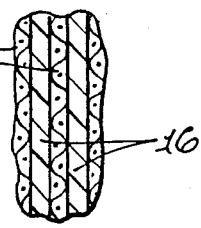
FIGS. 6 and 6a are enlarged views showing tub wall structure.
Figure 6A:
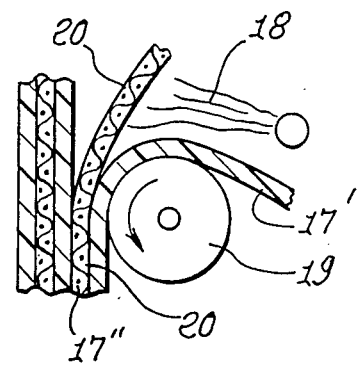

Referring first to FIG. 3, the apparatus 10 includes a tub 11 having an insulative, annular side wall 12, and a bottom wall 13 attached to side wall. The side wall comprises a foamed plastic sheet or sheets 14 wound in a spiral about the tub axis 15, to form multiple layers. The latter are better indicated at 16 in FIG. 6, with glass fiber reinforcement screen material 17 between the foamed plastic layers 16. such layers may typically consist of polyethylene foam of between $\frac{1}{8}$ and $\frac{3}{8}$ inch thickness, as for example about $\frac{1}{4}$ inch thickness; and the glass fiber screen may define about $\frac{1}{2}$ inch square open spaces between woof strands, and between warp strands. The polyethylene layers are rapidly joined together as by engagement of the outermost layer, during spiral winding, with a heating flame 18 and a roller 19, as seen in FIG. 6a. The pressure roller presses the heated inner surface of the outermost layer 17' against the flame heated outer surface of the next inner layer 17'' to establish fusion contact, as for example through the spaces between warp strands 20, and also between woof strands extending at 90° to strands 20. Thus, an integral relatively stiff and very sturdy spiral fusion laminated light-weight side wall 12 is gradually formed during the spiral winding process; and a person may sit comfortably on the top edge or rim 12a of the wall 12 without damaging it or the tub construction.

The tub bottom wall 13 has a similar construction. except that parallel sheets 13a ($\frac{3}{8}$ inch thick) of cross linked polyethylene foam, with or without glass fiber layers 12 therebetween, are heat fusion welded to form an integral bottom wall. The latter is then peripherally fusion welded as at 22 to the bottom of the side wall. A plastic jacket 23 may be fitted about both the side wall and bottom wall. Jacket 23 sheets may consist of foamed, reinforced, marine vinyl resin; and include inner sheet 23a, outer sheet, 23b, crest sheet 23c, and bottom sheet 23d, all joined together to form an internal waterproof decorative jacket, as shown. Jacket lower edge extent may be looped as at 23e, and a draw string fitted in the loop to be drawn tight and attach the jacket to the wall 12. A welded seam is indicated at 23f. The vinyl jacket may have selected weatherable color.

Figure 4:
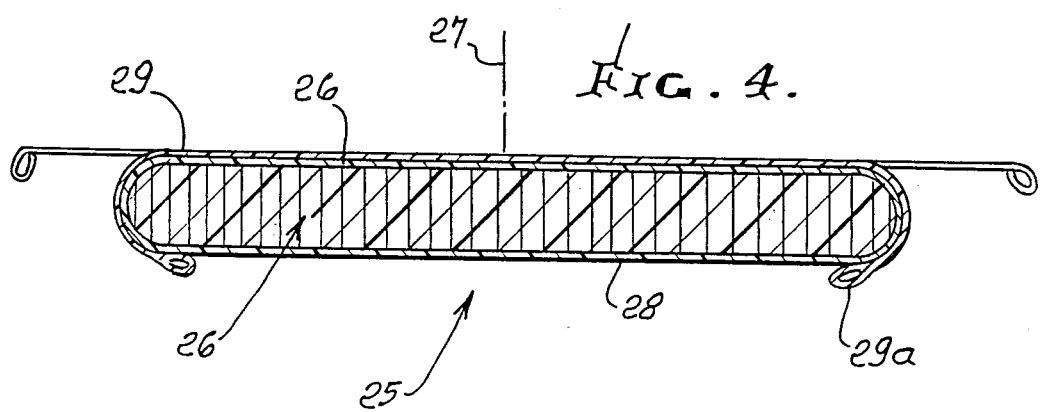
FIG. 4 is an enlarged section showing interior construction of the spa unit cover.

A pool cover is shown at 25 in FIG. 4, with generally the same spiral polyethylene layer construction, as does wall 12. Thus, spiral polyethylene layer or layers 26 extending about vertical axis 27 can be fusion welded together, similar to the wall section but typically without the fibers. Additional structure and stiffness is imparted to the cover by creating thermally densified layers on each face, 26 and 28. These are created by compressing the spiral wound structure between two hot plattens. A vinyl jacket 29 is fitted about the polyethylene windings, and is held in place by a draw string in loop 29a.

Figure 1:
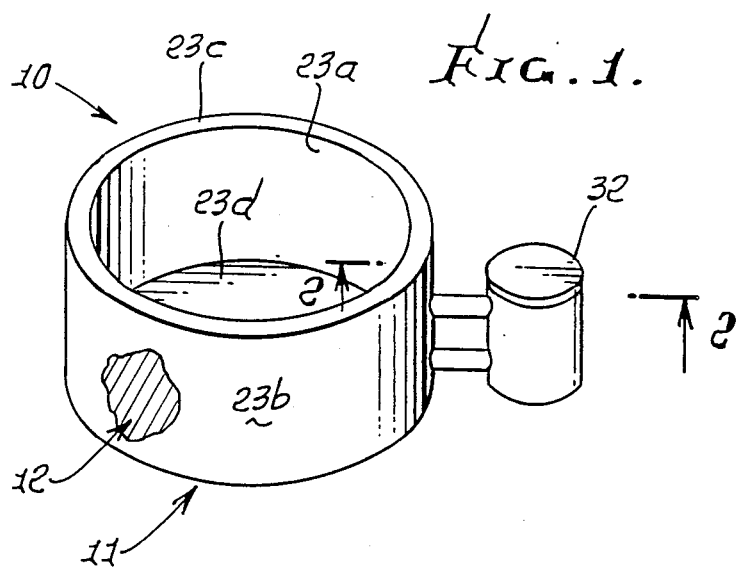
FIG. 1 is a perspective view of spa equipment embodying the invention.
Figure 2:
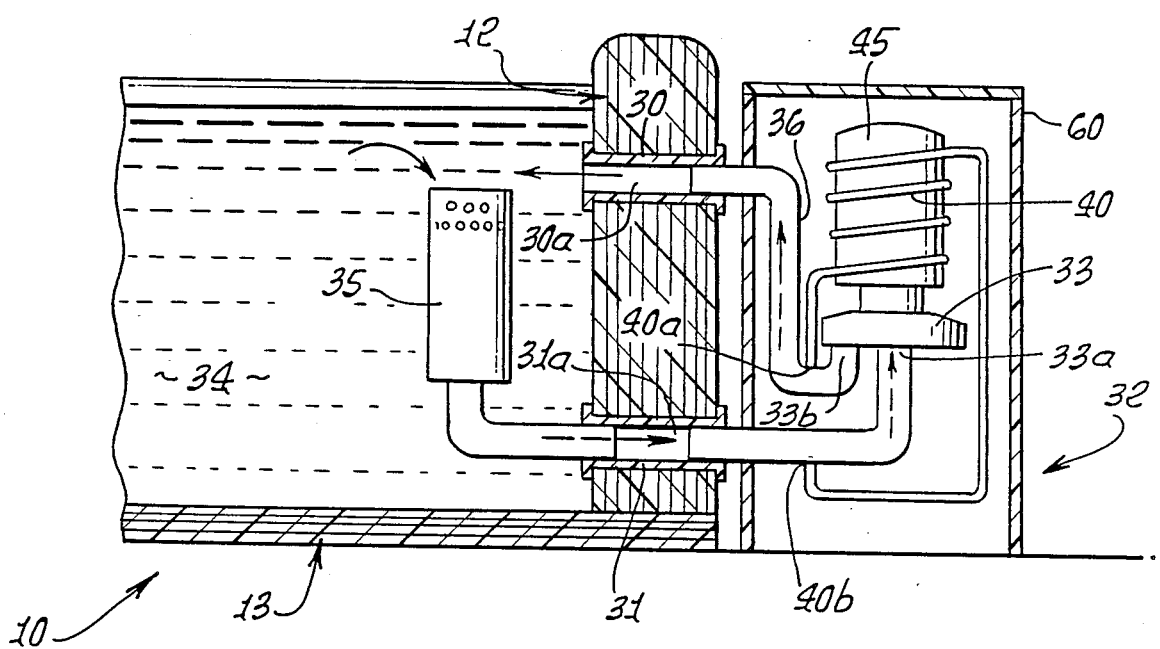
FIG. 2 is an enlarged section on lines 2—2 of FIG. 1.

FIG. 2 shows upper and lower ports formed through the tub wall as by tubular plastic fittings 30 and 31. Water circulating means 32 is connected with those ports, and includes a pump 33, for circulating water into the tub interior 34 via upper port 30a, and for withdrawing water from the tub interior 34 as via lower port 31a. A filter 35 is located within the tub to filter the water being withdrawn through port 31a, so that dirt and small objects are not fed to the pump lower inlet 33a. The filter is easily withdrawn upwardly at the tub interior, for cleaning or replacement. The pump discharges sidewardly at outlet 33b, and plastic piping extends upwardly at 36 to deliver pressurized and heated water to port 30a.

In accordance with an important aspect of the invention, the water circulating means includes an electric motor connected in driving relation with said pump, and includes a shunt duct connected with the water circulating means and located to receive heat generated by operation of the motor to heat a side stream of the water passing through the shunt duct. The illustrated shunt duct includes metallic tube 40 wound about the pump drive motor 45 to receive heat from same, for heating the tub water, whereby extreme simplicity and energy savings are realized. The duct 40 has an end connected at 40a into the water circulating system proximate pump outlet i.e. into piping upper branch 36; its opposite end connected as at 40b into the water circulation system proximate pump inlet 33a, i.e. in lower piping branch 43 extending from port 31a to inlet 33a. Accordingly, water flows in the shunt duct from a higher (pressurized) level to a lower level; and a portion of the water flowing through the pump is heated and re-heated, for highly efficient heating action. Thus, no external source of heat for the hot-tub water is required, and motor 45 serves multiple functions, its waste heat being efficiently utilized. The height of the inlet and outlet of the shunt duct are approximately the same to minimize thermosyphon action when the motor is off. The thermosyphon action can cause a momentary surge of extra hot water to trip the high limit switch 49.

Figure 5:
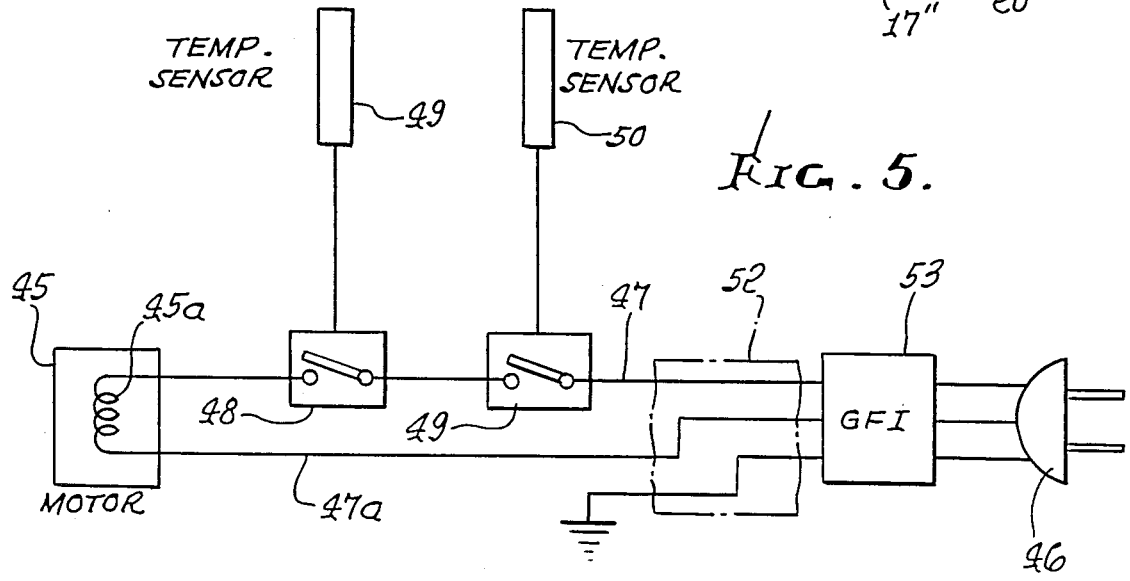
FIG. 5 is a wiring diagram.

In the schematic of FIG. 5, the motor coil 45a is supplied with electrical energy from a plug 46, such as is insertible into a household 120 volt outlet receptacle. The wiring interconnecting the plug and coil includes line 47 with which thermostat switch 48, and high limit switch 49 are connected in series. Switch 48 is operated by a thermostat sensor 49 applied to inlet port 30a, whereby if the water is too hot, the motor is shut down. Limit switch 49 is also controlled by temperature sensor 50 located adjacent the tub to shut the motor down if the tub becomes overheated. Line 47 and return line 47a pass through cord 52, and through a ground fault interruptor 53, as shown.

A plastic shell enclosure or housing for the pump and motor is indicated at 60. It is well insulated to keep the heat generated by the motor inside where it can be transmitted to the water, and to minimize sound from the motor and pump inside for the comfort of the users. It is a compact package which facilitates ease of transport and set-up of same.

We claim:

1. A spa tub comprising,
   (a) a multi-layered, upstanding insulative annular side wall having an inner and an outer surface, said side wall being formed from an outer-most sheet layer of foamed plastic sheet material followed by alternating sheet layers of glass fiber reinforcement screen material and sheet layers of foamed plastic material, each successive fiber sheet layer and foamed plastic sheet layer being applied to said outer sheet layer by winding in a spiral fashion about an axis passing through the center of the space enclosed by said side wall, successive foamed plastic sheet layers being fused together through openings defined by said screen material;
   (b) a bottom wall made up of parallel sheets of foamed plastic fused together, the bottom wall being bonded to the bottom of said side wall with said axis passing through said parallel sheets;
   (c) a water impermeable plastic jacket covering said inner surface of said side wall and overlying said bottom wall,
   (d) and including ports extending through said side wall and jacket, and water circulating means connected with said ports and including a pump for circulating water from and toward the interior of said tub.

2. The spa tub of claim 1 wherein said water circulating means includes an electric motor connected in driving relation with said pump, the pump having a water intake and a pressurized water discharge, the outlet being at a higher level than the intake, and including a shunt duct connected with said water circulating means and located to receive heat generated by operation of said motor to heat a side stream of said water passing through said shunt duct, the motor having a casing and the shunt duct including metallic tubing wrapped about the motor casing to receive heat therefrom, the shunt duct having inlet and outlet ends, the inlet end located proximate said pump discharge and the duct outlet end located proximate said pump intake and at a lower level than said inlet end.

3. The combination of claim 2 wherein the pump and motor are located in close proximity.

4. The apparatus of claim 1 wherein said jacket also surrounds the outer side of said side wall, the jacket consisting of vinyl material.

5. The apparatus of claim 1 wherein said side wall has an upper annular rim, and said jacket covers said rim to define an annular seat.

6. The apparatus of claim 1 wherein said outer foamed plastic sheet and foamed elastic layers consist of foamed polyethylene of a thickness between $\frac{1}{8}$ and $\frac{3}{8}$ inch, in one continuous spiral sheet layer.

7. The apparatus of claim 1 wherein said layers are fusion welded together over substantially their entire adjacent faces.

8. The combination of claim 1 including filter means in the spa tub, and connected in series with said water circulating means to remove particulate from the water circulating to the pump.

9. The combination of claim 1 including a cover extending over the interior of the tub, said cover including a foamed plastic sheet or sheets and forming multiple insulative layers which are fused together.

10. The combination of claim 9 wherein said cover foamed plastic sheet or sheets define a spiral about a central vertical axis.

* * * * *